May 26, 1970      A. R. CLOSE      3,514,155
SEAT BACK LATCH MECHANISM
Original Filed May 2, 1967
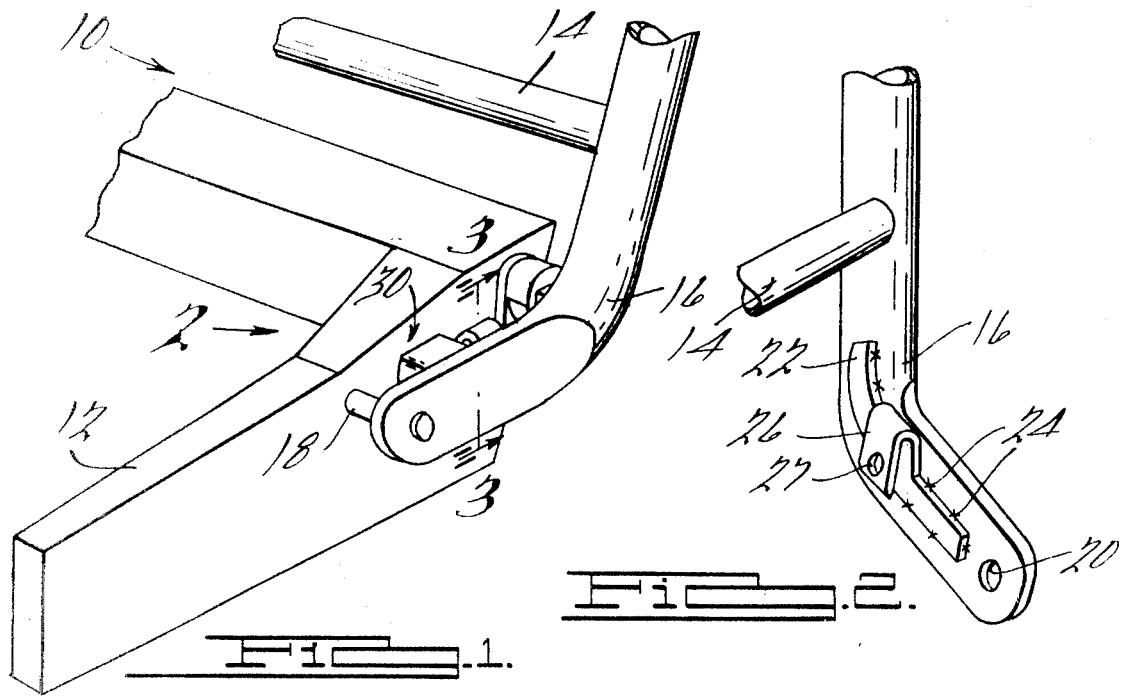
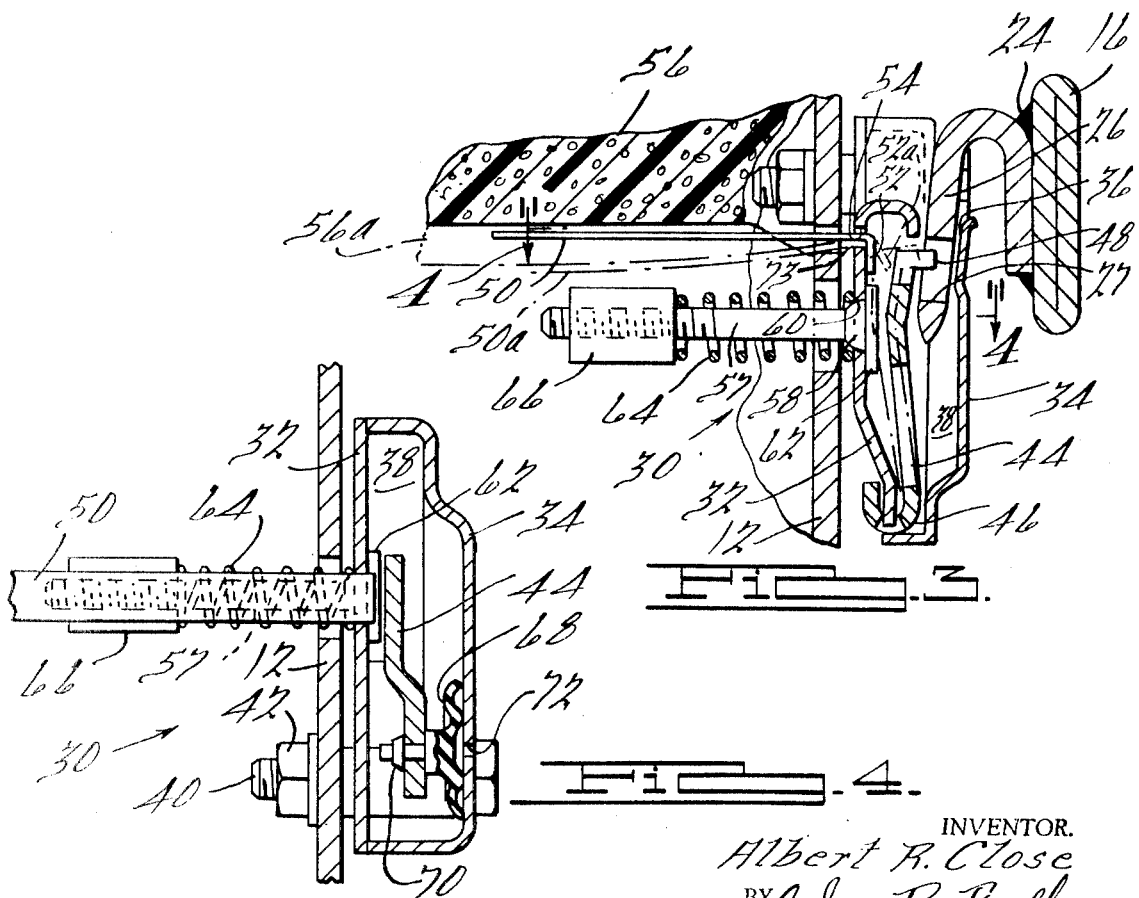
INVENTOR.
Albert R. Close
BY John R. Faulkner
E. Dennis O'Connor
ATTORNEYS under# United States Patent Office 3,514,155
Patented May 26, 1970

3,514,155
SEAT BACK LATCH MECHANISM
Albert R. Close, Oak Park, Mich., assignor to Ford Motor
Company, Dearborn, Mich., a corporation of Delaware
Original application May 2, 1967, Ser. No. 635,492, now
Patent No. 3,433,524, dated Mar. 18, 1969. Divided and
this application Aug. 22, 1968, Ser. No. 754,642
Int. Cl. B60m 1/02; A47c 3/00
U.S. Cl. 297—379           9 Claims

ABSTRACT OF THE DISCLOSURE

A mechanism for latching a pivotally mounted vehicle seat back relative to a horizontal seat member. This mechanism includes weight sensitive retaining means preventing seat back movement while the seat is occupied by a passenger and permitting normal pivotal seat back movement while the seat is unoccupied. Secondary retaining means, including an inertial control element, prevent relative seat back movement during periods of change in vehicle velocity whether or not the seat is occupied by a passenger.

---

This is a division of the U.S. patent application S.N. 635,492, filed May 2, 1967, now U.S. Pat. 3,433,524, issued Mar. 18, 1969.

BACKGROUND OF THE INVENTION

The prior art, typified by U.S. Pat. 2,559,548, issued July 3, 1951, discloses the use of a releasable latch mechanism for holding the pivoted or folding seat back of certain motor vehicle seat assemblies, such as those utilized in two-door models, against movement relative to the horizontal seat member. Obviously, such an arrangement contributes to the stability of vehicle passengers carried by the seat assembly as well as rear seat passengers during accident or so-called "panic stop" conditions. Manually operable control means conventionally are provided for releasing a latch mechanism when ingress or egress of rear seat passengers is desired. Such control means may prove bothersome and cumbersome to operate.

This invention provides a seat back latch mechanism that enhances the stability of motor vehicle passengers by preventing seat back movement relative to the horizontal portion of the seat assembly when such movement is unnecessary for passenger convenience. In particular, this mechanism locks the seat back against movement when a passenger is seated on the seat assembly. Secondary retaining means prevent seat back movement during periods of change in vehicle velocity even when no passenger is seated on the seat. This mechanism operates as described above without the necessity for the performance of a manual task by a vehicle passenger.

SUMMARY OF THE INVENTION

A seat back latch mechanism constructed in accordance with this invention is utilized in combination with a vehicle seat assembly having a substantially horizontal seat member and a seat back member pivotally secured to the seat member. Cooperating latch means are carried by each of these members for limiting movement by the seat back member relative to the seat member. The latch means include a latch element operatively secured to one of the seat members and having an aperture formed therein and adapted to receive detent means operatively secured to the other of the seat members for pivotal movement from a first position remote from the latch element to a second position engaging the latch element to a second position engaging the latch element and partially received in the latch element aperture. Sensing means are positioned below the cushion of the horizontal seat member that sense the deflection of the cushion due to the weight of a seated vehicle passenger. Such a deflection of the cushion causes the cushion to bear on the sensing means and deflect the latter. The sensing means, that is operatively connected to the detent means, exerts a force upon the detent means urging the detent means towards the aperture in the latch member when the sensing means is deflected. Operatively bearing on the detent means are inertia means exerting a force urging the detent means towards the aperture in the latch member during periods of change in vehicle velocity.

DESCRIPTION OF THE DRAWING

FIG. 1 is a partial isometric view of a motor vehicle seat frame including a latch mechanism constructed in accordance with this invention;

FIG. 2 is an isometric view of a portion of the structure of FIG. 1 taken along the line of sight represented by the arrow 2 of FIG. 1;

FIG. 3 is a sectional view taken along the line 3—3 of FIG. 1; and

FIG. 4 is a sectional view taken along the line 4—4 of FIG. 3.

DETAILED DESCRIPTION OF THE INVENTION

Referring now in detail to the drawings and in particular to FIGS. 1 and 2, the numeral 10 denotes a motor vehicle seat assembly frame having a substantially horizontal seat member 12 and a seat back member 14 including a conventional hockey stick 16. The seat back member 14 is movable relative to seat member 12 in that hockey stick 16 is pivotally attached to member 12 by a pivot pin 18 extending into a hole 20 formed in the hockey stick 16. A latch member 22, having an integrally formed latch element 26, is secured by welds 24 to the interior surface of hockery stick 16. Latch element 26 has an aperture 27 formed therein and a tapered end 28. A latch element retaining assembly 30 is mounted on seat member 12 as will be discussed in detail below.

As may be seen from FIGS. 3 and 4, assembly 30 includes a housing formed from housing plates 32 and 34 and having an opening 36 therebetween giving access to a housing cavity 38. Bolts 40, passing through the housing plates and seat member 12 cooperate with nuts 42 to fasten the housing plate together as illustrated, and secure the composite housing to seat member 12.

A detent 44, having a curved end 46 pivotally secured between housing plate 32 and 34, is swingable within cavity 38. The end of detent 44 remote from curved end 46 extends angularly from the main body of the detent.

Retaining assembly 30 is positioned on horizontal seat member 12 so that latch member 26 will extend downwardly through opening 36 and into cavity 38 when seat back member 14 is in the upright position. The position of latch member 26 within cavity 38 is such that aperture 27 is positioned in the path of movement of the angularly extending end 48 of detent 44. It readily may be appreciated that with detent end 48 received in aperture 27, upward movement of latch member 26 and hence pivotal movement of seat back 14 is restricted and said seat back member 14 may be considered to be locked in position relative to the horizontal seat member 12.

Retaining assembly 30 includes, for primary motivation of detent 44 so that the detent portion 48 extends into aperture 27 of latch member 26 to lock seat back 14 against movement, a leaf spring 50 having a substantially perpendicularly extending end 52 located within housing cavity 38. Spring 50 extends through a hole 54 in plate 32 and beneath a resiliently deformable seat cushion 56 that may be sprung and/or made of resilient padding such as foam rubber.

A rod 57, having rounded enlargement 58 cooperating with a mating aperture 60 and plate 32 to form a ball and socket coupling, has a flange 62 on one end thereof located within cavity 38. A compression spring 64 surrounds rod 57 and bears on plate 32 and a mass 66 secured at the end of rod 57 remote from flange 62, to maintain rod 57 at right angles to plate 32 during periods of constant vehicle velocity.

Detent 44 has secured thereto a suction cup 68 by a rivet 70. Suction cup 68 is, of course, formed from resilient material and is arranged to contact and be deformed against the interior wall of plate 34 about an orifice 72 when detent projection 48 extends within aperture 27. When a passenger is seated on cushion 56, the deflection of the cushion into the position 56a, illustrated in phantom, causes a corresponding deflection of spring 50 into the phantom position 50a. The contact point 73 between spring 50 and the bottom of hole 54 becomes a pivot point during this deflection of spring 50. Spring end 52 thus is forced from its normal position to the phantom position 52a where it bears on detent 44 and exerts a force causing movement of the detent so that projection 48 moves to a latching position within aperture 27. This movement of detent 44 causes suction cup 68 to be deformed against plate 34 as illustrated in FIG. 4.

When a passenger is no longer seated on cushion 56, the cushion, spring 50 and spring end 52 return to their original position. Since orifice 72 admits atmospheric pressure to the space between suction cup 68 and plate 34, the suction cup returns to its original shape and in so doing exerts a force that urges detent 44 counterclockwise into the unlatched position shown in phantom in FIG. 3. The latch mechanism is not disengaged instantaneously, however, since the size of orifice 72 is restricted to the extent that suction cup 68 returns to its original shape over a period of several seconds. This characteristic comprises an additional safety feature in that the seat back 14 will be held against movement in a vehicle crash situation until the crash forces are dissipated even if a seated passenger is thrown from cushion 56.

In the event no passenger is seated on cushion 56, seat back movement is prevented during periods of change in vehicle velocity by angular displacement of rod 57 due to inertia forces. The normal inertia forces bearing on rod 57 during periods of change in vehicle velocity greatly are increased due to mass 66 mounted on one end of rod 57. The total inertia forces acting on the rod overcome the force of spring 64 and resulting rod displacement causes flange 80 to bear against the detent 44, forcing the detent 44 in a clockwise direction so that projection 48 is received in aperture 27.

It thus may be seen that the seat back latch mechanism of this invention provides for passenger safety by locking the substantially vertically extending seat back against movement relative to the horizontal seat member without the need for the manual task to be performed by a vehicle passenger. This automatic locking is accomplished whenever a vericle passenger is seated on a horizontal seat member or during periods of change in vehicle velocity as occur during crash of "panic stop" conditions regardless of whether or not a passenger is seated on the seat assembly.

I claim:

1. A seat back latch mechanism for a vehicle seat assembly having a substantially horizontal seat member, a seat back member pivotally secured to said seat member and cooperating latch means carried by each of said members for limiting movement of said seat back member relative to said seat member, the improvement comprising: said latch means including a latch element operatively secured to one of said members and having an aperture formed therein, detent means operatively secured to the other of said members for pivotal movement from a first position remote from said latch element to a second position engaging said latch element and received in said aperture, pressure responsive means capable of sensing the weight of a person sitting on said horizontal seat member and urging said detent means into said second position upon the application of pressure thereto, resilient restoring means operatively connected to said detent means and urging said detent means toward said first position upon the termination of the pressure on said pressure responsive means.

2. The mechanism of claim 1, wherein said one member is in the seat member and said other member is the seat back member.

3. The mechanism of claim 2, wherein said seat assembly includes a yieldable seat cushion depressable downward and mounted above said seat member, said pressure responsive means comprising leaf spring means sensitive to the position of said cushion and movable into an operable position when said cushion is depressed downward.

4. In a motor vehicle having a substantially horizontal seat member, a yieldable cushion secured to and located above said seat member, a seat back member pivotally secured to said seat member for movement relative thereto and a seat back latch mechanism having cooperating latch means carried by each of said members for limiting movement of said seat back member relative to said seat member, the improvement comprising: said latch means including a housing secured to said seat member and having a first opening therein, a latch element secured to said seat back member for movement therewith remote from said housing to a position wherein said latch element extends through said first opening and into said housing, detent means pivotally secured within said housing, said latch element having an aperture formed therein adapted to receive a portion of said detent means, and cushion position sensitive control means secured to said seat member below said cushion and bearing on said detent means and exerting a force urging said portion toward said aperture when said cushion is displaced downward.

5. The combination of claim 4, wherein said control means comprises a leaf spring, one end of said spring extending through and pivoted at a second opening in said housing and having projection thereon angularly offset relative to the main body of said spring, said projection contacting said detent means.

6. The combination of claim 4, including resilient means carried by said detent means, bearing on said housing and exerting a force on said detent means urging said portion away from said aperture, the force exerted by said control means being greater than the force exerted by said resilient means.

7. The combination of claim 6, wherein said resilient means comprises a suction cup, said cup forced into contact with said housing to define an enclosed chamber by the force exerted on said detent means by said control means, and orifice means in said housing admitting atmospheric pressure to said chamber.

8. The combination of claim 4, including inertia means mounted on said housing and exerting a force urging said portion toward said aperture during periods of change in vehicle velocity.

9. The combination of claim 8, wherein said inertia means comprises a rod pivotally mounted through said housing, one end of said rod located proximate said detent means, a mass carried by the other end of said rod, resilient means biasing said rod into a first position during period of constant vehicle velocity, said rod assuming a second position during periods of change in vehicle velocity, shoulder means formed on said one end of said rod and extending substantially normal to the axis of the rod and substantially parallel to said detent means when said rod is in the second position.

References Cited

UNITED STATES PATENTS

| | | | |
|---|---|---|---|
| 2,873,794 | 2/1959 | Leslie et al. | 297—379 |
| 3,028,199 | 4/1962 | Beierbach et al. | 297—379 |
| 3,297,361 | 1/1967 | Murdoch | 297—379 |
| 3,339,976 | 9/1967 | Karl | 297—379 |
| 3,433,524 | 3/1969 | Close | 297—379 X |
| 3,444,949 | 5/1969 | Pollock | 297—379 X |

FRANCIS K. ZUGEL, Primary Examiner

U.S. Cl. X.R.

296—65